United States Patent

Claffey et al.

[11] Patent Number: 6,144,334
[45] Date of Patent: Nov. 7, 2000

[54] METHOD AND APPARATUS FOR CALCULATING ACCESS BETWEEN SATELLITE CONSTELLATIONS AND GROUND TARGETS

[75] Inventors: Douglas Claffey, Malvern; James Woodburn, King of Prussia, both of Pa.

[73] Assignee: Analytical Graphics, Inc., Malvern, Pa.

[21] Appl. No.: 09/030,977

[22] Filed: Feb. 26, 1998

[51] Int. Cl.[7] .................................................. H04B 7/185
[52] U.S. Cl. ............................................. 342/352; 701/226
[58] Field of Search ................................ 342/352, 357.01; 701/226; 455/427, 13.1

[56] References Cited

U.S. PATENT DOCUMENTS

| | | | |
|---|---|---|---|
| 5,408,237 | 4/1995 | Patterson et al. | 342/354 |
| 5,448,621 | 9/1995 | Knudsen | 379/58 |
| 5,519,404 | 5/1996 | Cances et al. | 342/354 |
| 5,537,679 | 7/1996 | Crosbie et al. | 455/132 |
| 5,543,813 | 8/1996 | Araki et al. | 342/357 |
| 5,552,794 | 9/1996 | Colley et al. | 342/357 |
| 5,596,328 | 1/1997 | Stangeland | 342/357 |
| 5,600,328 | 2/1997 | Tachita et al. | 342/357 |
| 5,610,614 | 3/1997 | Talbot et al. | 342/352 |
| 5,697,050 | 12/1997 | Wiedeman | 455/12.1 |
| 5,721,810 | 2/1998 | Hahn et al. | 395/50 |

*Primary Examiner*—Thomas H. Tarcza
*Assistant Examiner*—Dao L. Pham
*Attorney, Agent, or Firm*—Roberts Abokhair & Mardula LLC

[57] ABSTRACT

Assessing performance of satellite constellations. For a given constellation of satellites, each having a given number of sensors, a method is disclosed for determining the times of access between each sensor and a plurality of targets located on Earth. Calculation time required for determining access is greatly decreased using pre-computed access calculations as a baseline.

9 Claims, 5 Drawing Sheets

○ REPORT: ACCESS - ACCESS  _ □ ×
FILE  EDIT                     HELP

AreaTarget-_new_jersey_1-To-Satellite-Satellite1-Sensor-Sensor1,Sensor-Sensor3: A _new_jersey_1-To-Sensor1

| Access | Start Time (UTCG)      | Stop Time (UTCG)       | Duration (SEC) |
|--------|------------------------|------------------------|----------------|
| 1      | 1 Jul 1998 00:37:25:87 | 1 Jul 1998 00:41:05:35 | 219.482        |

_new_jersey_1-To-Sensor3

| Access | Start Time (UTCG)      | Stop Time (UTCG)       | Duration (SEC) |
|--------|------------------------|------------------------|----------------|
| 1      | 1 Jul 1998 00:36:05:31 | 1 Jul 1998 00:41:06:25 | 300.940        |

FIG. 5 ing 6,144,334

METHOD AND APPARATUS FOR CALCULATING ACCESS BETWEEN SATELLITE CONSTELLATIONS AND GROUND TARGETS

FIELD OF THE INVENTION

The present invention relates generally to assessing the performance of satellite constellations. In particular, the present invention relates to a solution for the problem of determining, for a given constellation of satellites, each having a given number of sensors, the times of access between each sensor and a plurality of targets of varying sizes and shapes on the surface of the Earth, and providing that information for various decision making processes.

BACKGROUND OF THE INVENTION

The determination of periods of access between a satellite constellation and targets on the surface of the Earth is a computationally expensive, extremely time-consuming process. A typical example would involve calculating access between 3,000 or more sensors (e.g., a constellation of 66 satellites, each having 48 sensors) and 3,000 or more targets, including many area targets of irregular shape—a total of more than 9 million access calculations. Even with high speed computer equipment employing state-of-the art satellite system analysis software, calculating a week of access under such circumstances would require nearly a year of processing time. A more limited problem—such as calculating loss of access due to failure of one or more sensors on a given satellite in the constellation—could take several hours to process.

To overcome the shortcomings of approaches used to date, a method and apparatus is needed that will yield quick and accurate estimates of access times, based on a series of access calculations performed in advance for a single (possibly hypothetical) satellite over a systematically selected set of revolutions. Using the pre-computed access calculations as a baseline, such a method would estimate the access times between a given satellite in the constellation and a given target by interpolation and other appropriate adjustments. As the calculations required for interpolation and correction factors are much simpler than those required to actually calculate access between satellite constellations and ground targets, such a method would provide this necessary information in a much more timely manner.

SUMMARY OF THE INVENTION

It is therefore an object of the present invention to provide a method and apparatus to yield quick and accurate estimates of access times from satellites in a constellation, and subfields of view of those satellites, to a plurality of targets on the surface of the earth.

It is a further object of the present invention to provide a method and apparatus to yield quick and accurate estimates of access from satellites in a constellation, and subfields of view of those satellites, to a plurality of targets on the surface of the earth, based on a series of access calculations performed in advance for a single, hypothetical satellite over a systematically selected set of revolutions.

It is a further object of the present invention to provide a method and apparatus to speed up significantly access calculations for a typical satellite constellation by a large order of magnitude.

BRIEF DESCRIPTION OF THE DRAWINGS

FIG. 5 illustrates a report for the two hypothetical orbit passes of FIG. 3.

DETAILED DESCRIPTION

Figure 1:
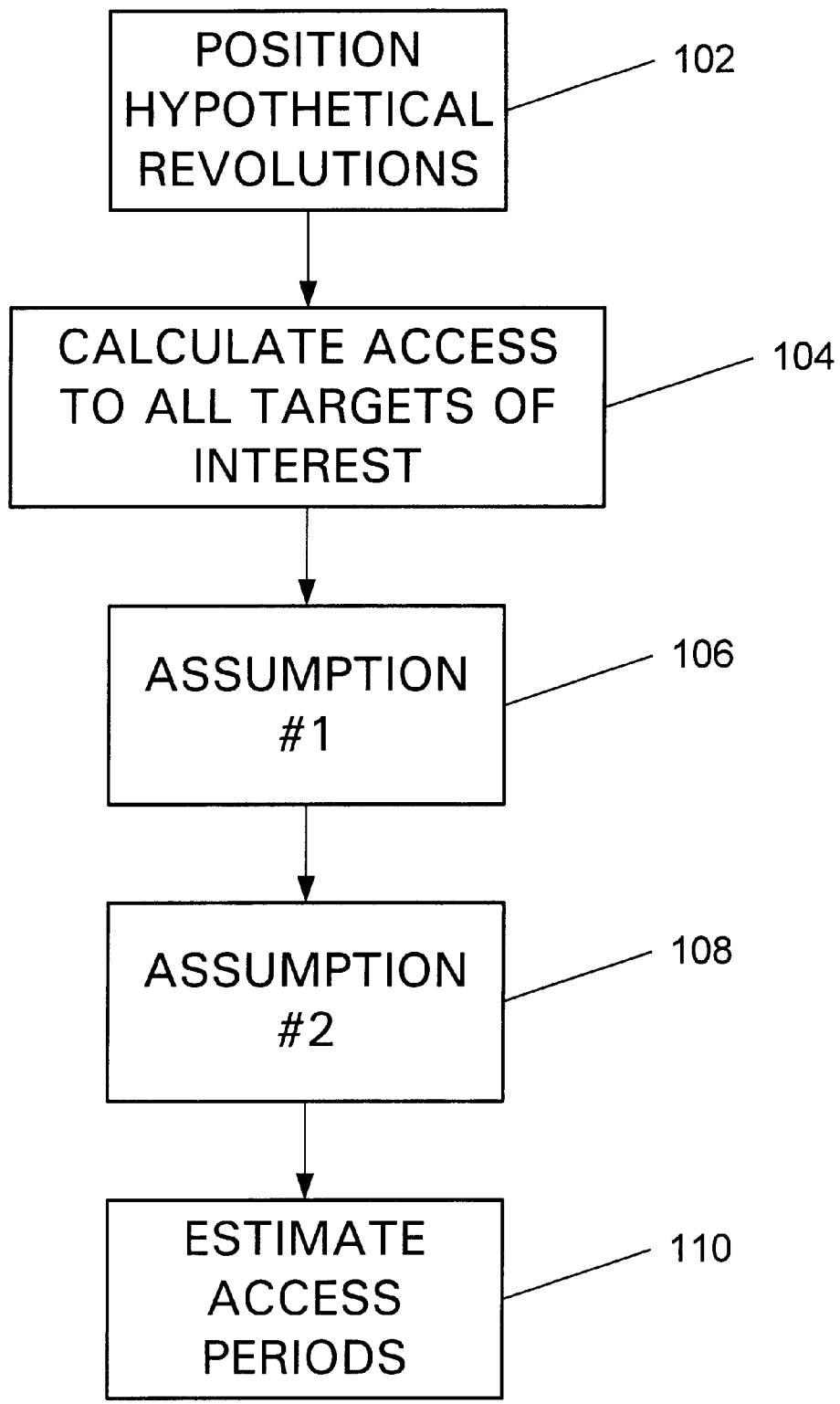
FIG. 1 illustrates the flow of processing of the present invention.

Referring to FIG. 1, the practice of the present invention is depicted. Several revolutions of an initial satellite having the characteristics of a member satellite of the constellation of interest, using approximate orbital parameters, supplied by the user are calculated 102. In a preferred embodiment, each revolution of the single satellite would differ from the preceding one in terms of longitude of ascending node (LAN), with time past the ascending node (TPAN) held constant at 0. The degree of difference in LAN between any two revolutions would depend upon the acceptable level of granularity in the access computation. A typical example would be a series of 360 evenly distributed revolutions, in which the LAN of any given revolution would differ by one degree from that of the preceding one. For each revolution, access of the sensors of the single satellite in that specific orbit are calculated to all targets of interest 104 and stored.

In an alternative embodiment, the calculations can be performed for a hypothetical satellite. In another alternative embodiment, the calculations can be performed for a plurality of hypothetical satellites and stored for future access.

A satellite with a ground track having a consistent pattern of variation in latitude, as measured against the time past the ascending node, is assumed 106. It is also assumed that any subfields of view maintain a constant orientation relative to the ground track of the satellite 108.

Using the initial satellite or hypothetical satellite revolutions and pre-computed access periods as a baseline, the access periods between a subsequent satellite in the constellation and a given target $T_x$ are estimated 110.

Figure 2:
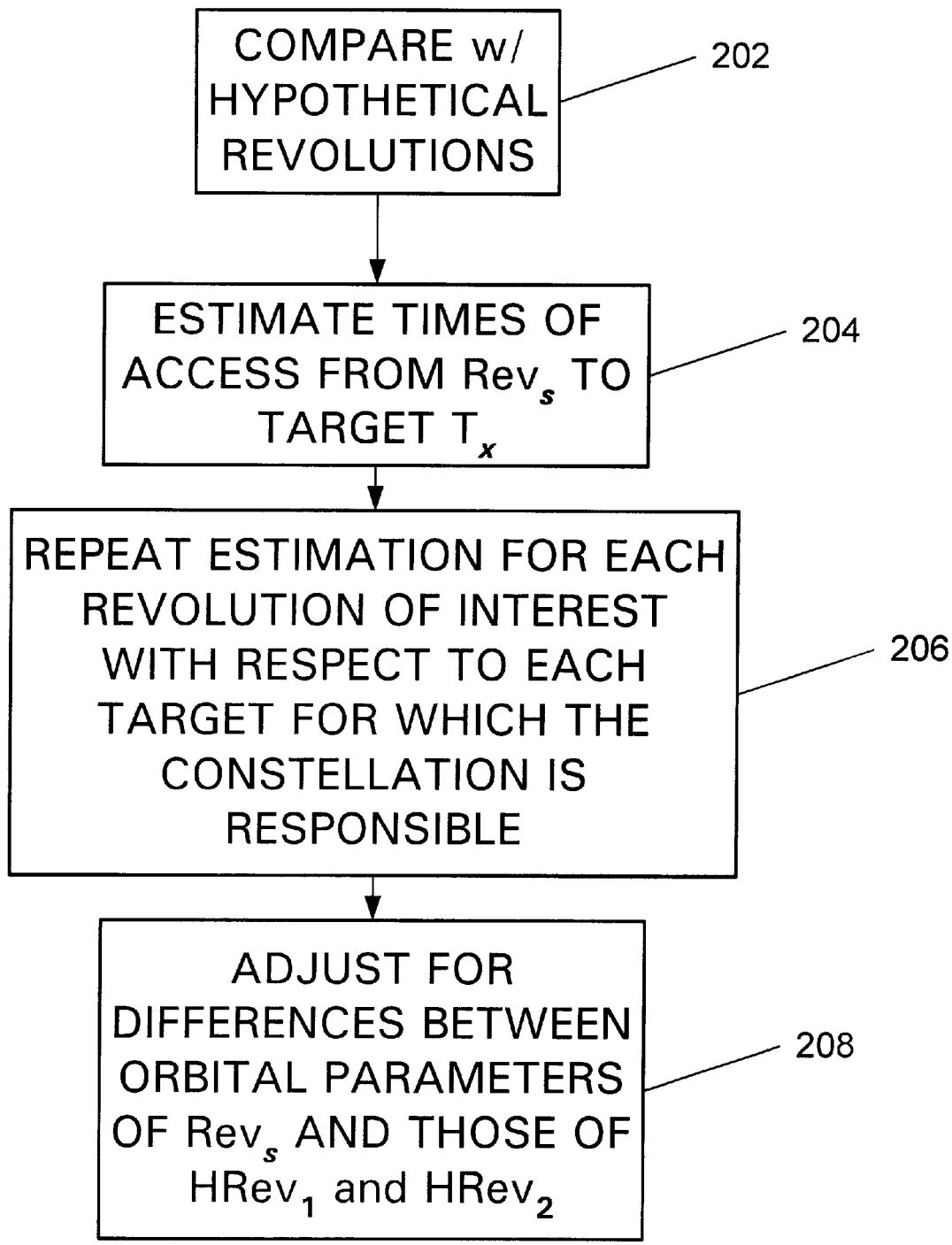
FIG. 2 illustrates the procedure for estimating the access periods between a given satellite in the constellation of interest and a given target $T_x$.

Referring to FIG. 2, the procedure for estimating the access periods between a subsequent satellite in the constellation and a given target $T_x$ is depicted. The approximate orbital parameters for a given revolution $Rev_s$ of the satellite of interest is compared to the approximate orbital parameters for two hypothetical revolutions $HRev_1$ and $HRev_2$ whose LAN values are closest to that of $Rev_s$ 202. Using a standard interpolation process and adjusting for the difference between the TPAN of $Rev_s$ and that of $HRev_1$ and $HRev_2$ (assumed to be 0), the times of access from $Rev_s$ to target $T_x$ is estimated 204. This process is repeated for each revolution of each satellite of interest with reference to each target for which the constellation is responsible 206.

Further adjustments are made for differences between the orbital parameters of $Rev_s$ and those of $HRev_1$ and $Hrev_2$ 208.

If the LAN of $Rev_s$ is equal within an error tolerance to that of one of the single satellite or hypothetical satellite revolutions, only one of the latter need be used, thus simplifying the process. In this event, it is still necessary to account for difference in TPAN and other factors.

In the preferred embodiment of this method, orbits of the constellation's satellites are propagated via a computer program for satellite system analysis. The satellite system analysis is also used for setting up the single satellite or hypothetical satellite revolutions used as a benchmark and for precomputing access from those single satellite or hypothetical satellite revolutions to the targets of interest. Reports and graphs generated by the computer program facilitate the comparisons needed for estimating access periods for the actual satellites of the constellation.

Figure 3:
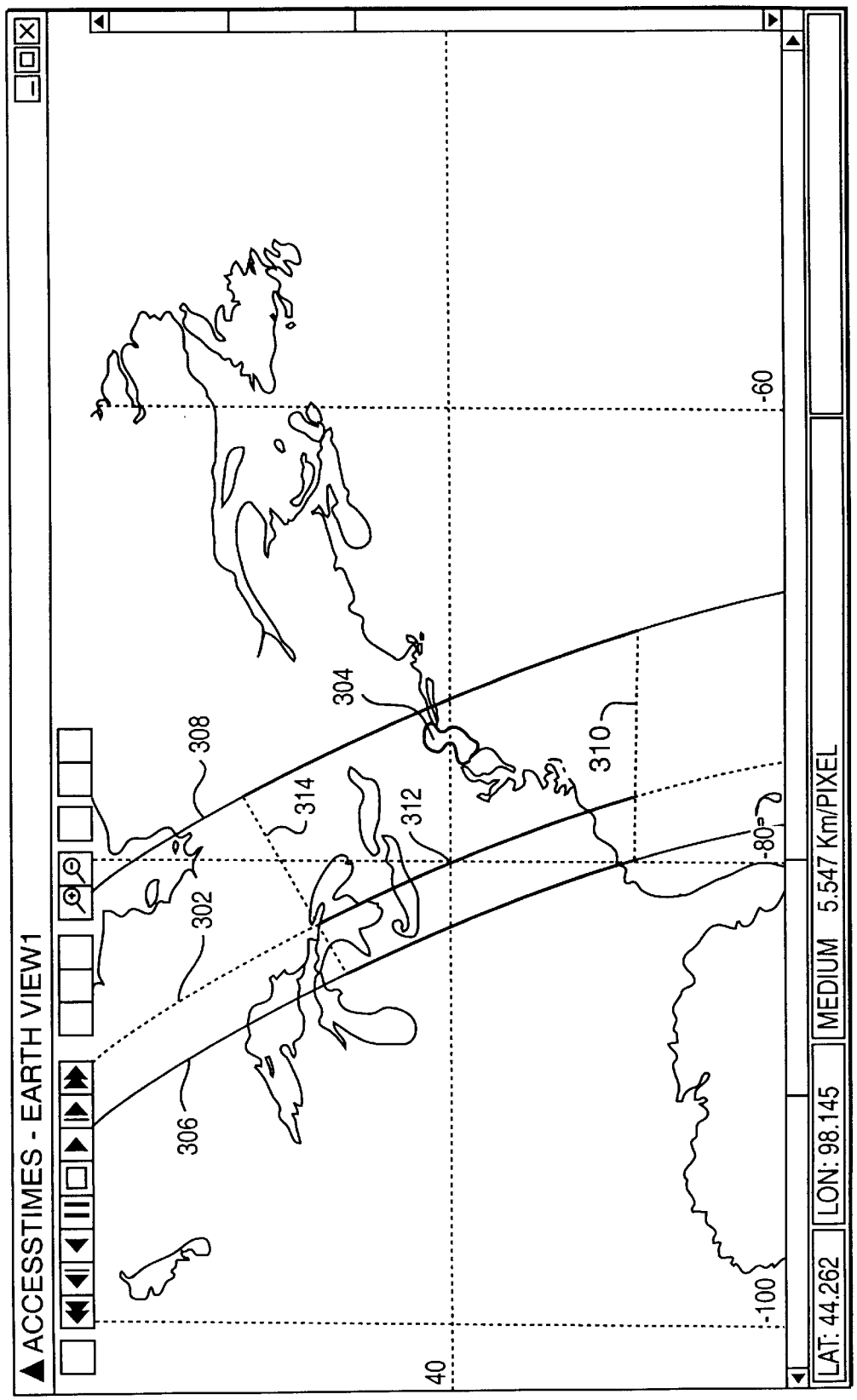
FIG. 3 illustrates a satellite orbit pass and an area target.

FIG. 3 shows a zoomed in map window having satellite orbit pass 302 and area target 304. In this example, the LAN of orbit pass 302 is 122.5 degrees. First reference hypothetical orbit pass 306 having a LAN of 120 degrees and second reference orbit pass 308 having a LAN of 130 degrees are also shown. Using a calculating means such as STK's Access Tool available from Analytical Graphics, Inc. of Malvern, Pa., access periods between hypothetical orbit passes 306 and 308 and area target 304 are calculated. Dashed lines 310 and 314 drawn respectively between the beginning and end points of the two access periods, allow the user to estimate access period 312 for northern directed real orbit pass 302.

Figure 4:
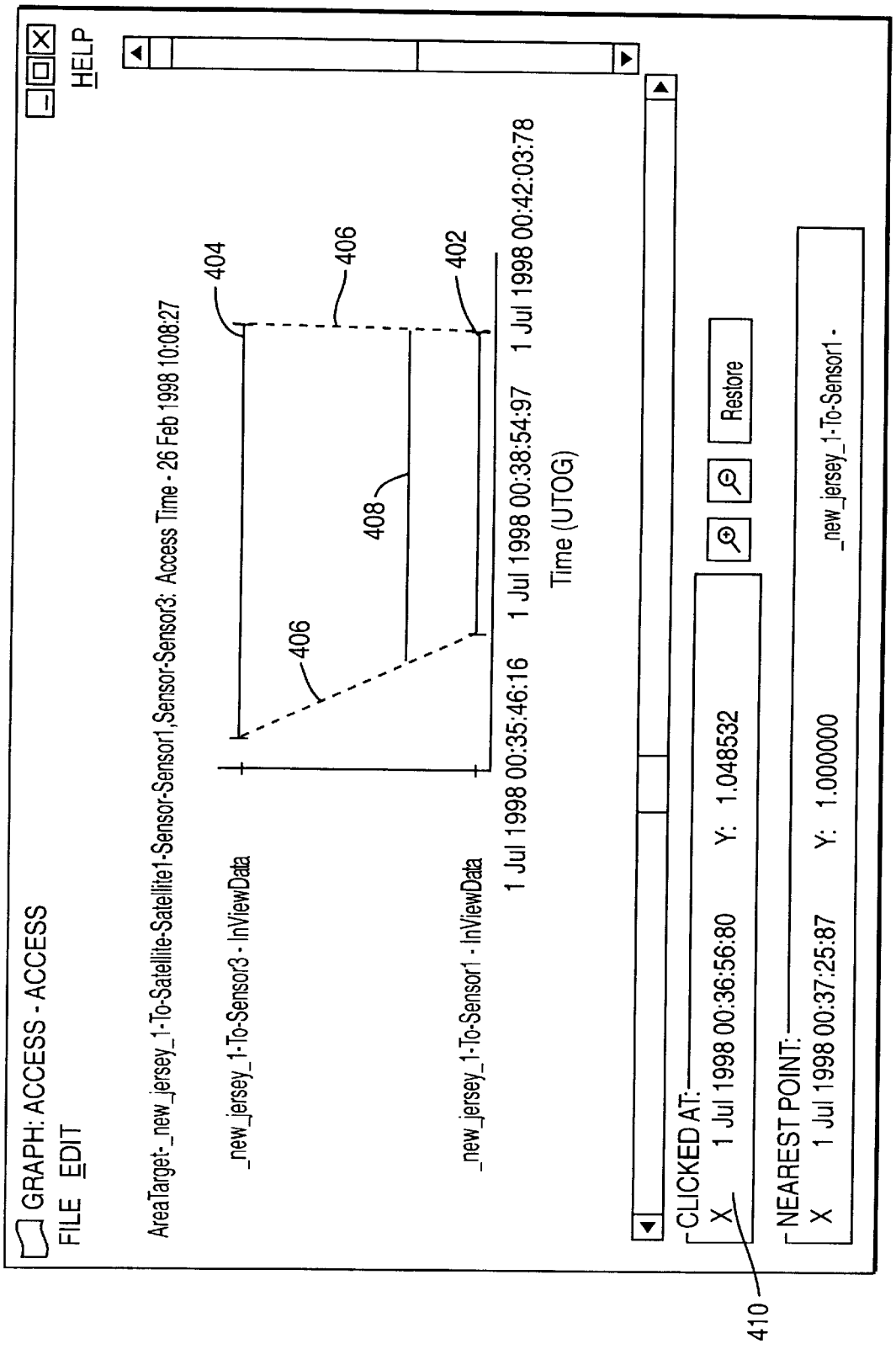
FIG. 4 illustrates an access graph for the two hypothetical orbit passes shown in FIG. 3.

FIG. 4 depicts an access graph for the two hypothetical orbit passes shown in FIG. 3. Lines 402 and 404 reflect the access periods calculated for hypothetical orbit passes 306 and 308, respectively. Dashed lines 406 connect the beginnings and ends of lines 402 and 404, and a line representing the orbit pass of interest 408 is drawn parallel to lines 402 and 404 and located at a point 25 percent of the distance between lines 402 and 404. This represents the relationship between the LAN of the real orbit pass, 122.5 degrees, and those of the hypothetical orbit passes, 120 and 130 degrees. The beginning and end points of line 408 provide a basis for estimating the access period between the orbit pass of interest and the area target. Coordinate feature 410 enables the user to display the x and y coordinates by clicking on a point on the graph. The beginning or end time of the access period of the real orbit pass can be shown by clicking on the beginning or end point of line 408.

FIG. 5 depicts a report for the two hypothetical orbit passes of FIG. 3. Using interpolation procedures, one can derive the approximate start and stop times of the access period for the real orbit pass are derived.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, but are not expressly stated herein. These modifications, alterations and improvements are intended to be suggested hereby, and within the spirit and scope of the invention. Accordingly, the invention is limited only by the following claims and equivalents thereto.

What is claimed is:

1. A method for determining access between a sensor and a target comprising:

inputting initial approximate orbital parameters of a first satellite bearing a sensor;

determining approximate orbital parameters for revolutions of the first satellite bearing a sensor;

storing the approximate orbital parameters for revolutions of the first satellite bearing the sensor;

determining the first satellite access periods to a target;

storing the first satellite access periods to the target;

determining estimated access periods between at least one subsequent satellite and the target, wherein determining estimated access periods further comprises:

comparing approximate orbital parameters for the revolutions of the first satellite;

estimating the time of access from a given revolution of the subsequent satellite ($Rev_s$) to the target using interpolation; and displaying the time of access graphically for an analyst to use in mission planning.

2. The method for determining access between a sensor and a target of claim 1, wherein the first satellite is hypothetical and approximate orbital parameters for the revolutions of the first satellite are hypothetical.

3. The method for determining access between a sensor and a target of claim 2, wherein the hypothetical revolutions used are those with longitude of ascending node values closest to that of $Rev_s$.

4. The method for determining access between a sensor and a target of claim 3, wherein estimating the time of access from $Rev_s$ to the target further comprises interpolating and adjusting for the difference between time past the ascending node of $Rev_s$ and that of the hypothetical revolutions.

5. The method for determining access between a sensor and a target of claim 4 further comprising:

repeating the method of claim 4 for each of a plurality of targets.

6. The method for determining access between a sensor and a target of claim 4 further comprising:

repeating the method of claim 4 for a plurality of revolutions of a plurality of subsequent satellites.

7. The method for determining access between a sensor and a target of claim 4, further comprising:

adjusting for differences between orbital parameters of $Rev_s$ and those of the hypothetical revolutions.

8. The method for determining access between a sensor and a target of claim 1, wherein displaying the time of access graphically comprises generating and orbital path and target areas graphical representation.

9. The method for determining access between a sensor and a target of claim 1 wherein displaying the time of access graphically comprises generating an access graph for two hypothetical orbit passes of the first satellite.

* * * * *